United States Patent
Fischer

[11] Patent Number: 6,072,708
[45] Date of Patent: *Jun. 6, 2000

[54] PHASE CONTROLLED SWITCHING REGULATOR POWER SUPPLY

[75] Inventor: Mark Charles Fischer, The Colony, Tex.

[73] Assignee: Benchmarq Microelectronics, Inc.

[*] Notice: This patent issued on a continued prosecution application filed under 37 CFR 1.53(d), and is subject to the twenty year patent term provisions of 35 U.S.C. 154(a)(2).

[21] Appl. No.: 08/688,854

[22] Filed: Aug. 1, 1996

[51] Int. Cl.[7] .................................................. H02M 5/42
[52] U.S. Cl. .............................. 363/84; 363/16; 363/86; 363/90
[58] Field of Search .................. 363/85, 86, 90, 363/128, 79, 16; 323/237, 247

[56] References Cited

U.S. PATENT DOCUMENTS

| | | | |
|---|---|---|---|
| 3,193,750 | 7/1965 | Chait | 363/85 |
| 3,617,851 | 11/1971 | DuPuy et al. | 320/134 |
| 4,007,413 | 2/1977 | Fisher et al. | 363/18 |
| 4,167,777 | 9/1979 | Allington | 363/61 |
| 4,357,587 | 11/1982 | Philberth et al. | |
| 4,368,419 | 1/1983 | Welty | 363/86 |
| 4,405,889 | 9/1983 | Overstreet et al. | 363/86 |
| 4,628,426 | 12/1986 | Steigerwald | 363/17 |
| 4,672,295 | 6/1987 | Poninski | |
| 4,692,851 | 9/1987 | Attwood | 363/16 |
| 4,714,978 | 12/1987 | Coleman | 361/235 |
| 4,794,507 | 12/1988 | Cavigelli | 363/86 |
| 4,999,566 | 3/1991 | Kuehn | 323/222 |
| 5,179,331 | 1/1993 | Sloot | 315/411 |
| 5,181,160 | 1/1993 | Okamoto et al. | 363/97 |
| 5,235,502 | 8/1993 | Vinciarelli et al. | 363/20 |
| 5,300,744 | 4/1994 | Maehara et al. | 219/687 |
| 5,302,858 | 4/1994 | Folts | |
| 5,303,138 | 4/1994 | Rozman | |
| 5,352,970 | 10/1994 | Armstrong | |
| 5,383,106 | 1/1995 | Yoshida et al. | 363/15 |
| 5,396,410 | 3/1995 | Okochi et al. | 363/21 |
| 5,398,181 | 3/1995 | Yeh | 363/21 |
| 5,402,329 | 3/1995 | Wittenbreder, Jr. | 363/127 |
| 5,434,767 | 7/1995 | Batarseh et al. | 363/16 |
| 5,459,650 | 10/1995 | Noro | 363/24 |
| 5,475,293 | 12/1995 | Sakai et al. | 318/802 |

FOREIGN PATENT DOCUMENTS

| | | |
|---|---|---|
| 0 744 817 | 11/1996 | European Pat. Off. |
| 0 757 429 | 2/1997 | European Pat. Off. |
| 2 702 606 | 9/1994 | France |
| 61-008678 | 1/1986 | Japan |
| WO 93 12581 | 6/1993 | WIPO |

OTHER PUBLICATIONS

McLyman, Colonel William T., "Transformer and Inductor Design Handbook" 1978, Marcel Dekker, Inc. New York, pp. 194–199. (no month).

Primary Examiner—Jessica Han
Attorney, Agent, or Firm—Mark E. Courtney; W. James Brady, III; Frederick J. Telecky, Jr.

[57] ABSTRACT

A switching regulator device for charging applications includes a transformer (18) which receives an AC input signal from an AC source (12) which is then rectified with a bridge rectifier (24). A regulation control circuit (26) is provided for regulating the output level of the bridge circuit (24) to a load (20). The regulation circuit (26) includes a switching element (62) which is operable to draw current from the AC source (12) in a periodic manner. The on/off duty cycle of the control to the switching element (62) will allow energy to be stored in a leakage inductance (36) of the transformer (18). The transformer (18) therefore comprises the switching inductance of a switching power supply with the leakage inductance (36) designed to provide adequate regulation for the voltage and current supplied to the load (10).

27 Claims, 4 Drawing Sheets

PHASE CONTROLLED SWITCHING REGULATOR POWER SUPPLY

TECHNICAL FIELD OF THE INVENTION

The present invention pertains in general to power supplies, and, more particularly to a switching power supply for a battery charging operation that utilizes the leakage inductance of the primary transformer as the switching element.

BACKGROUND OF THE INVENTION

In conventional switching power supplies, an inductive element is usually provided which is utilized to store energy on a periodic basis by connecting it to a power source through a switching element, which stored energy is then transferred to a load. The switching element is controlled through a control device that detects the output voltage or current and then changes the on/off duty cycle of the switching element to vary the output voltage or current level, depending upon whether the regulation is current or voltage.

Most switching power supplies utilize a fairly high frequency for the switching operation to reduce the size of the magnetics. This provides for a lighter and lower cost power supply. However, the considerations that are prominent in the power supply designer's mind are directed toward the efficiency of the design, the heat generated by the design and the peak currents in the design.

In some designs, a transformer is utilized to provide the initial transformation from a high input AC voltage to an intermediate AC voltage and then the switching performed on the output of the transformer. In this type of design, the transformer is typically optimized to reduce the leakage inductance in the transformer by tightly coupling the primary and secondary windings in the transformer to reduce the leakage inductance, and minimizing the series resistance, to reduce heat dissipation in the transformer. The primary reason is to reduce the size as much as possible and achieve a much more efficient low temperature transformer for a given application. For switching transformer applications, this typically will require an additional switching inductor for use with a higher frequency application, since the primary transformer typically operates at the line frequency of the input signal.

The primary disadvantage with most systems that utilize a primary transformer for reducing the voltage on the input to an intermediate AC voltage and then utilizing a conventional switching power supply circuit for regulation is the additional inductive element required for the switching operation. This results in an increased number of parts and complexity of the design.

SUMMARY OF THE INVENTION

The present invention disclosed and claimed herein comprises a power supply for converting a voltage from an AC signal source at a first level to a regulated DC output at a lower voltage level for delivery to the load. The transformer has a primary winding wound on a core and connected across the AC source and a secondary winding wound on the core. The transformer has a designed finite leakage inductance associated therewith. A rectification circuit is connected to the secondary winding for rectifying the current therefrom for delivery to the load. A switching element is provided for selectively allowing current to be delivered from the AC source through the transformer to the load such that the energy from the AC source is transferred to the leakage inductance and then from the leakage inductance to the load. A switch control is provided for controlling the switching element to operate in a periodic mode, whereby the current to the load is measured and the switching element switched at a varying periodic rate to adjust the current and deliver it to the load. This is effected in such a manner that the leakage inductance and the switching element operate in accordance with a switching regulation operation.

In another aspect of the present invention, the switching element is either connected between a secondary winding and the load, or in series with the primary winding.

In yet another aspect of the present invention, a trickle device is provided for allowing the transformer to pass current from the AC source to the load when the switching element is in a non-conductive mode.

BRIEF DESCRIPTION OF THE DRAWINGS

For a more complete understanding of the present invention and the advantages thereof, reference is now made to the following description taken in conjunction with the accompanying Drawings in which.

DETAILED DESCRIPTION OF THE INVENTION

Figure 1:
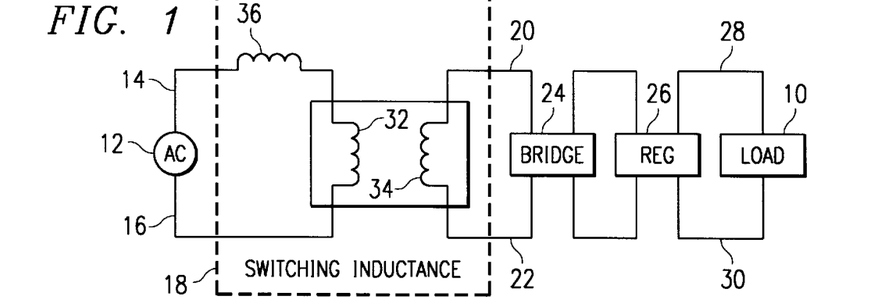
FIG. 1 illustrates an overall block diagram of the present invention.

Referring now to FIG. 1, there is illustrated an overall block diagram of the application of the present invention. A load 10 is provided, which in the preferred embodiment is a NiCd battery, the primary application being for charging the NiCd battery. The NiCd battery is charged from a 50/60 Hz alternating current (AC) source 12 connected across terminals 14 and 16. The terminals 14 and 16 are connected to the AC-input of a transformer 18, which transformer 18 functions as a level translator and switching inductance element. The output of the transformer 18 is provided on terminals 20 and 22, which provides an intermediate AC voltage lower than the AC voltage that is impressed across terminals 14 and 16. This is input to a bridge rectifier 24, the output thereof providing, in the preferred embodiment, a full wave rectified signal. This is then input to a regulation circuit 26, which is operable to perform a switching operation, the output thereof provided on terminals 28 and 30, positive and negative terminals, respectively, which are disposed across the load 10.

The transformer 18 that includes the switching inductance is comprised in part of a primary winding 32, a secondary winding 34 and a leakage inductance 36. The leakage inductance 36 is a part of the transformer that inherently exists as a result of the physical construction and design of the transformer. There is no additional inductive element that is provided that would allow for storage of the energy in accordance with the switching regulator operation.

As will be described in more detail hereinbelow, the switching regulation design of FIG. 1 allows for charging of the load 10 in the form of a NiCd battery directly from the 50/60 Hz AC source 12, this being a simple transformer/rectifier arrangement. This is facilitated with a phase regulation type of regulator 26, which limits the current spikes, due to the design of the transformer and the leakage inductance 36, as will be described in more detail hereinbelow. By limiting the current, heating of the transformer is minimized, as well as the stresses on the semiconductors utilized in both the bridge 24 and the regulator 26.

Figure 2:
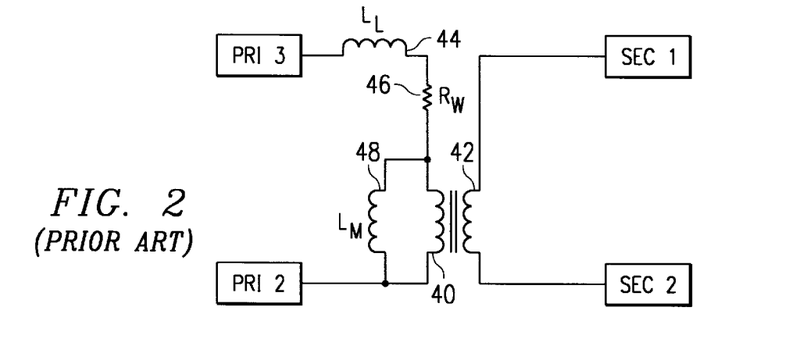
FIG. 2 illustrates a diagrammatic view of a conventional prior art transformer.

Referring now to FIG. 2, there is illustrated a diagrammatic view of a general prior art transformer, which will be utilized to discuss in general the aspect of leakage inductance as a part of an ideal transformer. The transformer is comprised of a primary winding 40 and a secondary winding 42 wound about a magnetic core. The result of the winding of the core with the primary winding 40 and the secondary winding 42 results in a leakage inductance 44 ($L_L$) disposed in series with the primary winding 40, with a winding resistance 46 ($R_W$) disposed in series therewith. In parallel with the primary winding 40 is a magnetizing inductance 48 ($L_M$).

In an ideal transformer, leakage inductance and series resistance are zero, while magnetizing inductance is infinite. Thus the output of the ideal transformer is as much an ideal AC voltage source as the original source voltage, with the output being scaled in value by the ratio of the turns on the secondary to the primary. Due to the physical constraints that exist in the real world, it is impossible to build a transformer in which all primary flux is linked to the secondary winding or with conductors of zero resistance. There also exists no infinitely permeable material which would make magnetizing inductance infinite. As a result of these limitations, physically realizable transformers have finite magnetizing inductance and measurable resistance and leakage inductance. Resistance and leakage inductance become parasitic loads which reduce the voltage coupling to the secondary. Conventional transformer design minimizes these parasitic effects. This conventional design approach, however, would produce extremely narrow current spikes with respect to time in the example regulator and very high current peaks in order to achieve average current regulation. This would lead to significant stresses on load and regulator circuits.

The magnetizing inductance 48 is the "real" inductance of the transformer primary 40 which is coupled to the secondary winding (42). The leakage inductance 44 is the net inductance of both the primary and secondary which is not coupled. These two inductances, as well as the winding resistance 46, are the parameters that can be varied by the transformer designer to achieve an optimum transformer design. To vary the magnetizing inductance 48, various aspects of the transformer can be varied. These are such things as the cross-sectional area of core, the core material and the number of turns, N. The winding resistance is varied by the selection of the wire gauge which is accomplished by choosing a transformer size that will accommodate the required turn density in its winding window. However, the present invention utilizes optimization of the leakage inductance (44) to provide for storage of energy therein which is later transferred to the load, while operating at the 50/60 Hz rate of the AC source 12.

Figure 3:
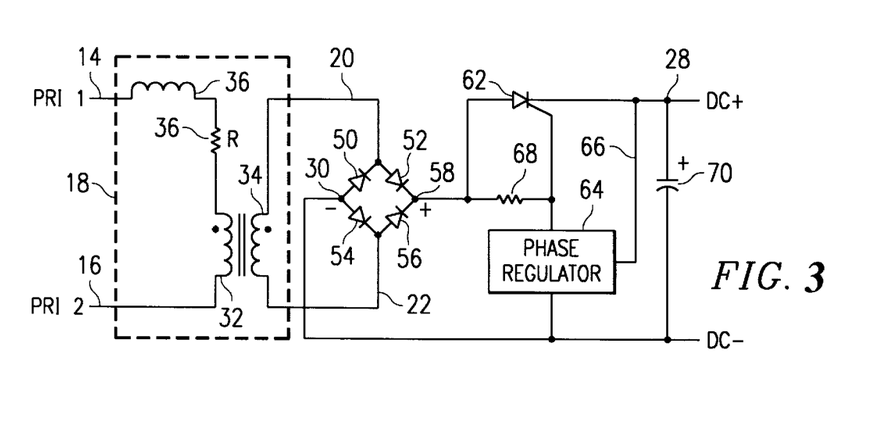
FIG. 3 illustrates a diagrammatic view of the preferred embodiment of the present invention.

Referring now to FIG. 3, there is illustrated a diagrammatic view of the embodiment of FIG. 1 illustrating in more detail the regulation circuitry. In this embodiment, bridge circuit 24 of FIG. 1 is a full wave rectified bridge which is comprised of four diodes 50, 52, 54 and 56. Diode 50 has the anode thereof connected to the node 30, the negative node, and the cathode thereof connected to the node 20, diode 52 having the anode thereof connected to node 20 and the cathode thereof connected to a positive node 58. Diode 54 has the anode thereof connected to the negative node 30 and the cathode thereof connected to the node 22. Diode 56 has the anode thereof connected to node 22 and the cathode thereof connected to node 58. This is a conventional rectifier configuration to provide a full wave rectifying signal between nodes 58 and 30.

An SCR 62 is provided having the anode thereof connected to node 58 and the cathode thereof connected to the output node 28, the output node 28 being the positive output voltage node to the load 10 (not shown). The SCR 62 has the gate thereof connected to the control output of a phase regulator circuit 64 for providing phase regulation, which phase regulation is based upon a sense input on a line 66 from the output node 28, which allows the phase regulator 64 to determine the output voltage and/or current. A resistor 68 is connected between the anode and gate of SCR 62. A capacitor 70 is disposed between the nodes 28 and 30.

It is important to note that the phase regulator 64 requires an input inductive element for storage of energy therein. This is not a separate element but, rather, is provided by the leakage inductance 36 of the transformer 18 itself. If the leakage inductance were not utilized, a separate discreet inductor would be required on input terminal 14. Since the transformer 18 operates at a relatively low frequency, the separate discreet inductance would have to be relatively large, of the magnitude of 200 mH, in order to provide adequate regulation. By designing the transformer 18 such that the internal leakage inductance 36 is of sufficient magnitude to provide adequate regulation, the need for an external inductor is alleviated and, therefore, a less complex system can be designed.

Figure 4:
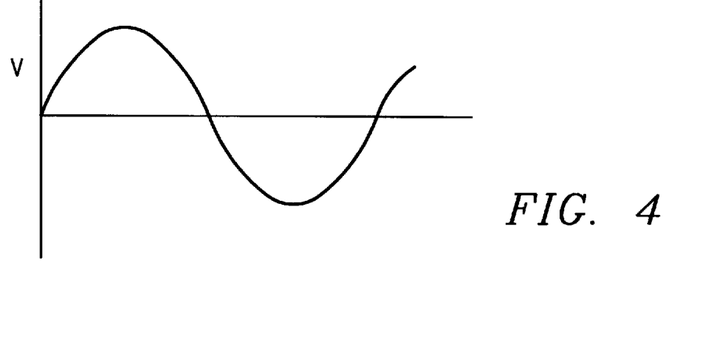
FIGS. 4–7 illustrate waveforms depicting the operation of the embodiment of FIG. 3.
Figure 5:
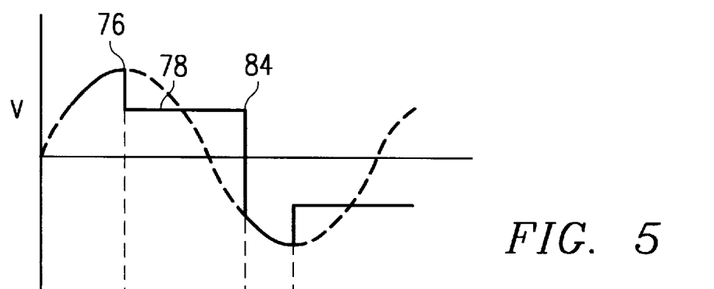
Figure 6:
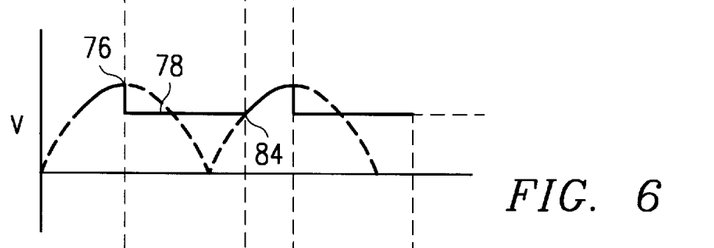
Figure 7:
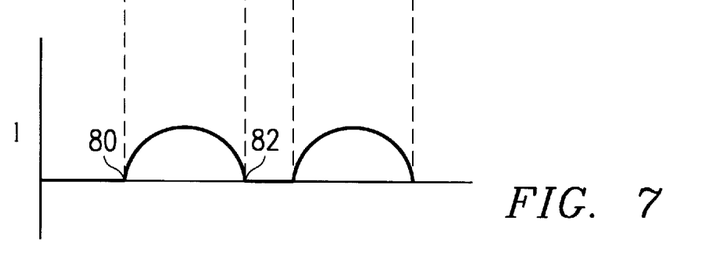

Referring now to FIGS. 4–7, there are illustrated waveforms depicting the overall operation of the phase regulator of FIG. 3. FIG. 4 depicts the input waveform across terminals 14 and 16. FIG. 5 depicts the waveform on the secondary 34 and primary 32, with FIG. 6 depicting the waveform on the output of the full wave rectifier. As the input signal in FIG. 4 rises, it can be seen in FIG. 5 that at a point 76, conduction is initiated by triggering the SCR 62. This causes the current through the secondary to rise and also causes a current through the primary 32 to rise. The immediate effect of SCR 62 triggering is to clamp the output voltage of transformer 18 to the load through the diodes 50, 52, 54, 56 and SCR 62. The clamped output voltage must then be reflected on the input winding 32 by the turns ratio of N1 to N2 as illustrated in FIG. 5. This does not account, however, for all of the input voltage, the residue of which must appear across the "parasitic" elements R and L 36. Since R is rendered "small" in this design the inductance L 36 limits the current delivered to the load by the integral of the impressed voltage with respect to time and scaled by its size according to the relationship:

$$I_L = \frac{1}{L}\int_0^\tau v(t)dt. \tag{1}$$

Since the source is varying sinusoidally, the voltage across L 36 will be reduced to zero when the input voltage equals the reflected clamped voltage on the secondary. The current in the inductor will then have achieved its peak value and as the source voltage continues its excursion to the opposite polarity the inductor will deliver its stored energy to the load by maintaining the voltage clamp at the secondary, itself becoming a current source in opposition to the impressed mains voltage. Only when the current in L 36 has decayed to zero at 84 will the voltage on the secondary again "track" the primary voltage by assuming the proper reflected sinusoidal value. FIG. 6 illustrates these effects as seen on the output of the rectifying elements. In the prior art system, of course, without the inductance 36, the current at point 80 will rise very quickly to a much higher level and cause the phase regulator to shift the phase angle to allow the current to be on for only a short period of time. These large current spikes cause excessive heating in the transformer that must be accounted for and also result in significant stresses to the semiconductor devices utilized for the switching operation.

In determining the design of the transformer wherein the leakage inductance and the transformer itself are utilized as the switching element, in addition to transforming the voltage from a high voltage to a low voltage, it is necessary to go through a specific design procedure. It is, of course, relatively straight forward and well known in the art to estimate leakage inductance on EE and EI cores as a function of a winding arrangement. This is disclosed in Col. W. T. McLyman, Transformer and Inductor Design Handbook, 1978, Marcel Dekker. In conventional design, the formulas are manipulated in order to minimize leakage inductance with typical "worst" cases illustrated with the windings laid side by side with no interleaving whatsoever. In general, the teachings provide that the leakage inductance vary directly as the width of the winding, mean length of the turn, and the square of the number of turns and inversely as the depth of the winding. Thus, to maximize inductance on an EI core would require maximum winding width, minimum depth and larger than normal winding area to accommodate adequate turns to accomplish the goal of high leakage inductance and low winding resistance. This requirement is inherent in a Ferroresonant EI core; however, such cores are costly. EI cores also tend to confine leakage flux to the area of the core window or to the semi-circular area on either side of the transformer adjacent to the windings. A structure which allowed the primary and secondary windings to "leak" flux on all sides would therefore be the best structure to use. Such a structure is generally available and commonly referred to as a UI core with a primary and a secondary winding wound on opposite legs.

When designing for leakage inductance (rather than minimizing leakage inductance) the designer must consider the behavior of the transformer under loaded and unloaded conditions. Many of the usual requirements that designers face will still apply in this design situation. The windings and cross-sectional area of the core must still be adequate to support the input voltage without saturating the core; however, a failure in this regard will less likely be catastrophic as the leakage inductance will limit the current rise in the primary. The output voltage under no load conditions will be attenuated somewhat by both the leakage inductance and the winding resistance, but the designer will normally design for a significantly higher voltage at the output than that to which he wishes to regulate. Depending upon the choice of core material, the leakage inductance will likely be hundreds of times smaller than the magnetizing inductance in any event. The transformer surface area must be adequate to reject the heat accumulated due to core and copper losses for a reasonable temperature rise. In this regard, the leakage inductance minimizes copper losses by maximizing the width of the current waveform and minimizing its amplitude while contributing few core losses due to the fact that it is primarily an air core inductor. When switched on across a load, the transformer output will clamp to the load while the reflected residual voltage on the primary appears across the leakage inductance and gradually increases the current in accordance with the voltage integral with respect to time. By increasing the conduction angle, more current is delivered to the load and the voltage on a filter capacitor would rise, i.e., phase regulation. As the load decreases, the conduction angle can also be decreased to maintain the output in current regulation. This provides some advantages in that, when the switching device, such as a thyristor, turns "on" and "off" at zero current, relatively low switching losses result. Secondly, the switching device such as the thyristor can be optically isolated to the primary side where the current that it is switching is reduced by the turns ratio, and its "on" voltage is much lower than that of a high voltage MOSFET.

In order to meet the design criteria for the transformer, it is necessary that the transformer be designed such that the output voltage meet the minimum gain requirements of a simple buck converter under low-line conditions. The conventional DC equation is $V_{out}=DxV_{in}$, where D is the duty cycle of the switch. In general terms, this means that the RMS value of the transformer output voltage during conduction must at least equal the output DC voltage plus the rectifying and resistive voltage drops. This would be the point, however, where no additional regulation would be possible. Therefore, for voltage regulation purposes, it would be desirable to make the output voltage of the transformer slightly higher during the design process, although the present application is described with respect to current regulation.

Figure 8:
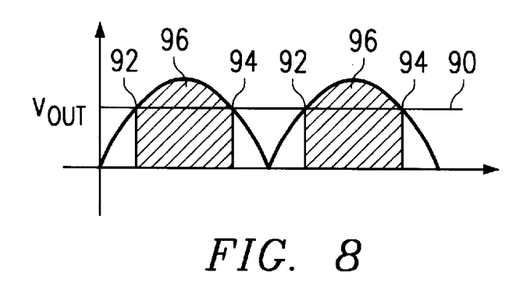
FIGS. 8 and 9 illustrate energy diagrams depicting design limitations.

Referring now to FIG. 8, there is illustrated a plot of the full-wave rectified signal illustrating that, as the input waveform rises to a level above the output voltage, the output voltage represented by a line 90 and the intersection of the input waveform and the line 90 represented by a point 92, the voltage will rise above the output voltage line 90 at the point 92 and fall below the output voltage at a point 94. It is noted that the portion of the curve between the points 92 and 94 is shaded as a region 96, with that portion of the region 96 above the $V_{out}$, line 90 representing the voltage available to store energy in the leakage inductance. By complying with the above stated requirements, the minimum peak voltage in the shaded area 96 will be determined. The minimum low-line peak voltage on the primary divided by the minimum secondary peak voltage will yield the minimum allowable turn ratio. This minimum peak voltage is determined with the following relationship:

$$V_{out} = \sqrt{\frac{1}{\pi}V_{pk}^2 \int_{\arcsin\frac{V_{out}}{V_{pk}}}^{\arcsin\frac{V_{out}}{V_{pk}}} \sin^2 x\, dx} \qquad (2)$$

Figure 9:
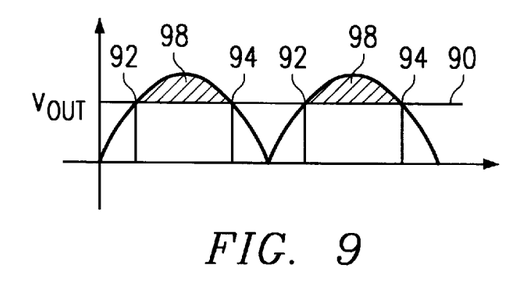

FIG. 9 illustrates the portion of the curve between points 90 and 94 above $V_{out}$ line 90 represented by a region 98, which region 98 represents the voltage available to store energy in the leakage inductance. Once a designer has determined the turns ratio, this value must then be determined to constrain the amount of impedance that can be tolerated in the transformer. This value, when applied across the transformer's parasitic impedances, must result in an RMS current at least equal to the full load current in the output to maintain regulation. This is achieved by integrating the area on the curve between the points 92 and 94 and above the line $V_{out}$, as represented by the region 98. The minimum residual RMS voltage to be applied across the transformer's impedance is determined as follows:

$$V_{RMS} = \sqrt{\frac{1}{\pi} V_{pk}^2 \int_{\arcsin \frac{V_{out}}{V_{pk}}}^{\arcsin \frac{V_{out}}{V_{pk}}} \left( |\sin x| - \frac{V_{out}}{V_{pk}} \right) dx} \quad (3)$$

This will result in the following constraints on the current:

$$I \leq \frac{NV_{RMS}}{\sqrt{R^2 + (2\pi f L)^2}} \quad (4)$$

where:

L=leakage inductance
f=switching frequency
R=winding resistance
N=winding ratio

In general, the designer refers all parameter values to the primary. This will simplify the design and all results will be defined in terms of the primary. The secondary turns are then merely scaled from the primary. The two important parameter values, as described above, are the required output load current and the residual RMS voltage after rectification. These are referred to the primary by dividing the current and multiplying the voltage by the turns ratio.

Figure 10:
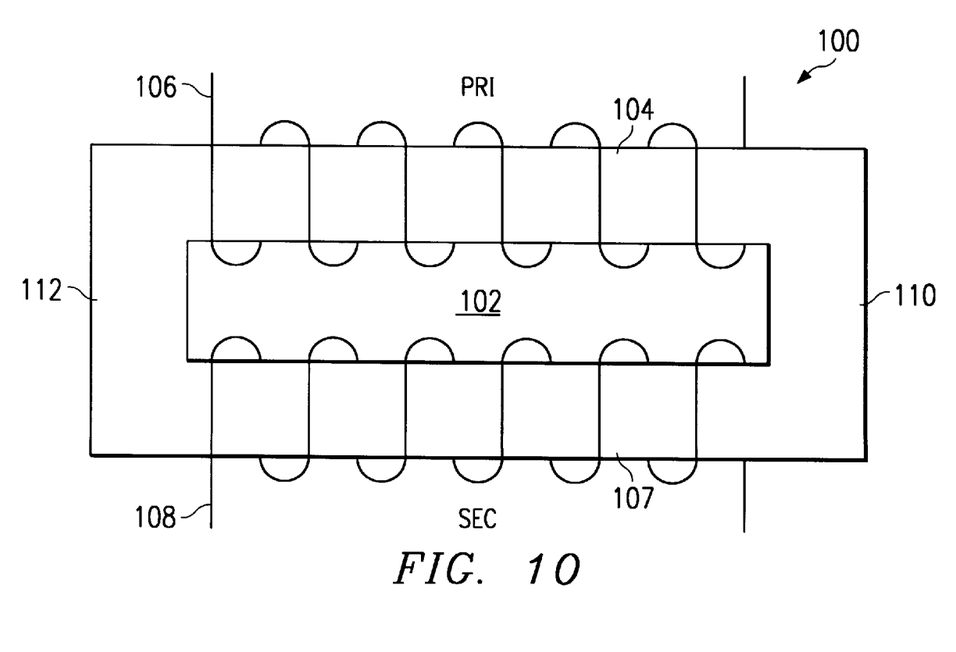
FIG. 10 illustrates a top view of the transformer utilized with the present invention.

Once the power requirements of the output are determined, the size of the UI core is determined. This sometimes is an iterative procedure. FIG. 10 illustrates a typical UI core 100 having a rectangular cross section with a window 102 defined therein. There is a primary winding leg 104 with a primary winding 106 disposed thereon and a secondary winding leg 107 with secondary winding 108 disposed therearound. The primary leg 104 and secondary leg 107 are joined by sides 110 and 112, respectively. The transformer is designed in multiples of a core width "C". In one exemplary design, the rectangular cross section will have a window that is equal to a width of C and a length of 3C with the edge of the length of each of the sides 110 and 112 being 3C and the width of each of the primary and secondary legs 104 and 106 and the side legs 110 and 112 being C. The mean length of a turn for each of the primary and secondary windings 106 and 108 is constrained by the bobbin or coil form (not shown) that the designer chooses to utilize in the manufacture of the transformer. However, since all the bobbin parameters cannot be specified until the height of the lamination is known, the designer must specify the bobbin's core clearance and the window area that will be useable. The process will yield the depth of a winding "B" and a core clearance to the actual winding which is multiplied by a factor of "8" in the mean length of turn constraining equation:

$$2 \cdot C + 2 \cdot H + 4 \cdot B + 0.4 = MLT \quad (5)$$

The above equation 3 will constrain the winding to cross the height "H," and cross-sectional measurement "C" twice per turn. This above equation also assumes a 0.05" clearance from the core to the winding to be filled by bobbin clearance and wall thickness. This clearance will be added to the winding length twice at each of the four corners resulting in an increment of 0.4". One half of the winding depth on average is also added to the length of a turn twice at each four corners yielding the 4×B term in the equation.

The other important geometric constraint to be obtained from the bobbin is the width of the winding "A". This parameter along with the mean length of turn (MLT) and the winding depth "B" constrain the winding resistance by the following approximate formula:

$$\frac{2 \cdot 10^{-12} \cdot MLT \cdot N_1}{A \cdot B} OHMS \quad (6)$$

where:

A, B are in inches.
$N_1$=number of primary turns

It is important to note that the number of primary turns "$N_1$" has now been introduced into a constraining equation. The leakage inductance, along with the total winding resistance, determine how much current can be delivered under the full load conditions.

The leakage inductance is constrained by the cross sectional area enclosed by each winding, by the length of the windings, "A", and by their interaction in the window area of the UI core chosen. This is predicted mathematically by using the formula for a "long" solenoid ($\mu_0 N^2 s/l$) as the maximum potential value of the leakage inductance and scaling it for the core's geometry. This formula is given below:

$$L = \frac{4 \cdot 10^{-7} \cdot \pi \cdot 4 \cdot N_1 - 0.0254 \cdot (H + 2 \cdot B + 0.1) \cdot (C + 2 \cdot B + 0.1)}{A} \cdot \left[ \frac{1}{2} + \frac{C + 2 \cdot B + 0.1}{2 \cdot (C + H + 4 \cdot B + 0.2)} + (H + 2 \cdot B + 0.1) \cdot \frac{C - 0.05 - \frac{B}{2}}{2 \cdot C \cdot (C + H + 4 \cdot B + 0.2)} \right] \quad (7)$$

The following is a brief discussion explaining the various terms in the above equation. The first term represents the maximum potential value of the leakage inductance as predicted by the long solenoid equation. It is noted that two scaling factors have been added. The first is a factor of four which allows the MKS value for the permeability of free space. The second is a factor of 0.0254. The factor of four has two contributors. The obvious one is that we are dealing with two windings who inductive effects are in series and thus linearly additive. The less obvious one is that the windings enclose both space and core material. Thus the leakage flux will tend to "prefer" the path in the core to the enclosed free space. Since this path is thousands of times more permeable than "free space", it has the effect of reducing the magnetic path referred to free space by a factor of two. The factor of 0.0254 scales the formula from meters to inches. The enclosed cross sectional area is calculated to the full extent of the windings. This is shown in the formula as encompassing the height, H, twice the depth of the windings, B, and twice the assumed winding clearance from the core, 0.05", times the cross sectional measure, C, summed with its associated winding depths and clearances. The winding length, A, serves as the length of the solenoid.

The term in brackets in the above equation is the scaling factor for the leakage inductance and is composed of three terms. These are arrived at as described in the following. The windings possess two broad and two narrow faces parallel to which the leakage flux passes. One of the broad faces is inside the core window and faces the opposing winding.

Since all the leakage flux must flow across all of these faces, the total leakage inductance is scaled by each face's potential interaction with the opposing winding with its potential contribution being its length divided by the perimeter of all four faces. Since, as mentioned previously, each winding has two pairs of faces, and three faces have no potential interaction with the opposing winding, it follows that one broad and one narrow face can be assumed to contribute fully to the leakage inductance. This results in the first term in the scaling factor ½. The second term is then the contribution to the leakage inductance by the second narrow face, being its length divided by the full perimeter of all four faces. The third term includes the length of a long face divided by the perimeter, but it is scaled by its potential interaction with the opposing winding. This is done by assuming that all the leakage flux is confined to the window, and, because the flux will once again "prefer" the core path to the air, it is reasonable to assess that the leakage flux from each winding will distribute itself uniformly across the window of the core with all flux lines being effectively orthogonal to the cross bars. Then, flux lines that link every turn of the opposing winding become part of the transformer and do not figure in the leakage inductance; however, flux lines that only partially link the opposing winding are partly transformer and partly inductance. Therefore, all flux outside the region defined by the core clearance, 0.05", and one half the winding depth, B, can be counted as leakage inductance. The contribution of the fourth face to the leakage inductance is therefore scaled by the width of the window, C, less the core clearance and half the winding depth, divided by the window width.

Once the above parameters have been determined, the forced RMS current in the primary caused by the residual voltage calculated with respect to FIG. 9 must be set equal to the required full load value by balancing the resistance and leakage inductance of the transformer according to Equation 4.

The next basic requirement of the workable transformer design is that the applied voltage result in a magnetic excitation that does not exceed the saturation level of the core material. With core measurements expressed in inches, this requirement is expressed by the following equation:

$$16000 \geq \frac{58161 \cdot 115}{N \cdot 0.92 \cdot C \cdot H} \qquad (8)$$

The factor of 0.92 in the denominator represents the nominal stacking factor of fully interleaved laminations. The numerator factor 115 is the nominal mains line voltage. The value of 16000 (Gauss) is intended to leave adequate margin for line voltage variation.

The final requirement in a constraint that determines whether the design will "work" is to substitute the calculated and measured design parameters in an inequality to determine whether the total power dissipation is within "reasonable" limits. This condition is stated mathematically as follows:

$$I^2 \cdot \left(\frac{R}{2}\right) + (I + I_{EX})^2 \cdot \left(\frac{R}{2}\right) + P_{CORE} \leq (50 \cdot C^2 + 18 \cdot C \cdot H) \cdot 0.194 \qquad (9)$$

where:
  I=Regulated current referred to the primary.
  R=Total winding resistance referred to the primary.
  $I_{EX}$=Excitation current calculated from core manufacturer's data.
  $P_{CORE}$=Core loss calculated from core manufacturer's data.
  $(50 \cdot C^2 + 18 \cdot C \cdot H)$=Approximate surface area of the transformer in inches$^2$.
  0.194=Permissable power dissipation in W/inch$^2$ for a 25 degree C. rise.

The left side of Equation 9 consists of three terms. The first term represents the secondary copper losses as the multiple of the square of the regulated current and half the total resistance referred to the primary. The second term represents the primary copper loss consisting of the square of the sum of the forced and excitation currents multiplied by one-half the total resistance referred to the primary. The third term represents the core losses. The excitation current and core loss must then be adjusted for the grade and thickness of steel desired. The right side of Equation 9 represents the total surface area of the transformer multiplied by the tolerable power loss per square inch for the desired temperature rise. An example of the application of this formula for a UI350 core is as follows:

$$\left[\frac{I^2 \cdot R}{2} + \left(\frac{R}{2}\right) \cdot \left[I + \frac{0.92 \cdot H \cdot 0.65431}{169 \cdot 0.014 \cdot 90} \cdot \left(\frac{5.8161 \cdot 90}{N \cdot 0.92 \cdot C \cdot H}\right)^{7.7511}\right]^2\right] + \qquad (10)$$

$$\frac{0.92 \cdot H \cdot 0.72656 \cdot \left(\frac{5.8161 \cdot 90}{N \cdot 0.92 \cdot C \cdot H}\right)^{2.1544}}{169 \cdot 0.014} \leq$$

$$(50 \cdot C^2 + 18 \cdot C \cdot H) \cdot 0.194$$

It is important to note that Equation 10 is for a specific core.

The above noted six constraints can be implemented in a computer program that will iterate to produce an optimum design for any given application. If additional complexity is added to the program, it may be possible to output the smallest transformer design on the highest grade of core material all the way to the largest "workable" design on the lowest grade of core material.

In general, it can be seen that by designing the transformer to take advantage of an increased leakage inductance for the purpose of creating a switching element with the transformer, it is then possible to prevent high peak currents without the requirement of an external switching inductance. This allows a relatively straight forward "loosely" coupled transformer to be designed taking advantage of the increased leakage inductance, wherein energy is actually stored in the transformer with the overall system switched at the frequency of mains and, subsequently, rectified and transferred to the load as a regulated voltage.

The phase regulation circuit 64 can be implemented with a bq2004 integrated circuit manufactured by Benchmarq Microelectronics. The operation of the switching configuration in a power supply application of this integrated circuit is described in U.S. Pat. No. 5,352,970, issued Oct. 4, 1994, and assigned to the present assignee, which U.S. Patent is incorporated herein by reference. It is important to note that the phase regulator 64 in FIG. 3 is associated with a switching element, the SCR 62, and the output of the transformer; however, the switching element could be incorporated into the input leg on the primary.

Figure 11:
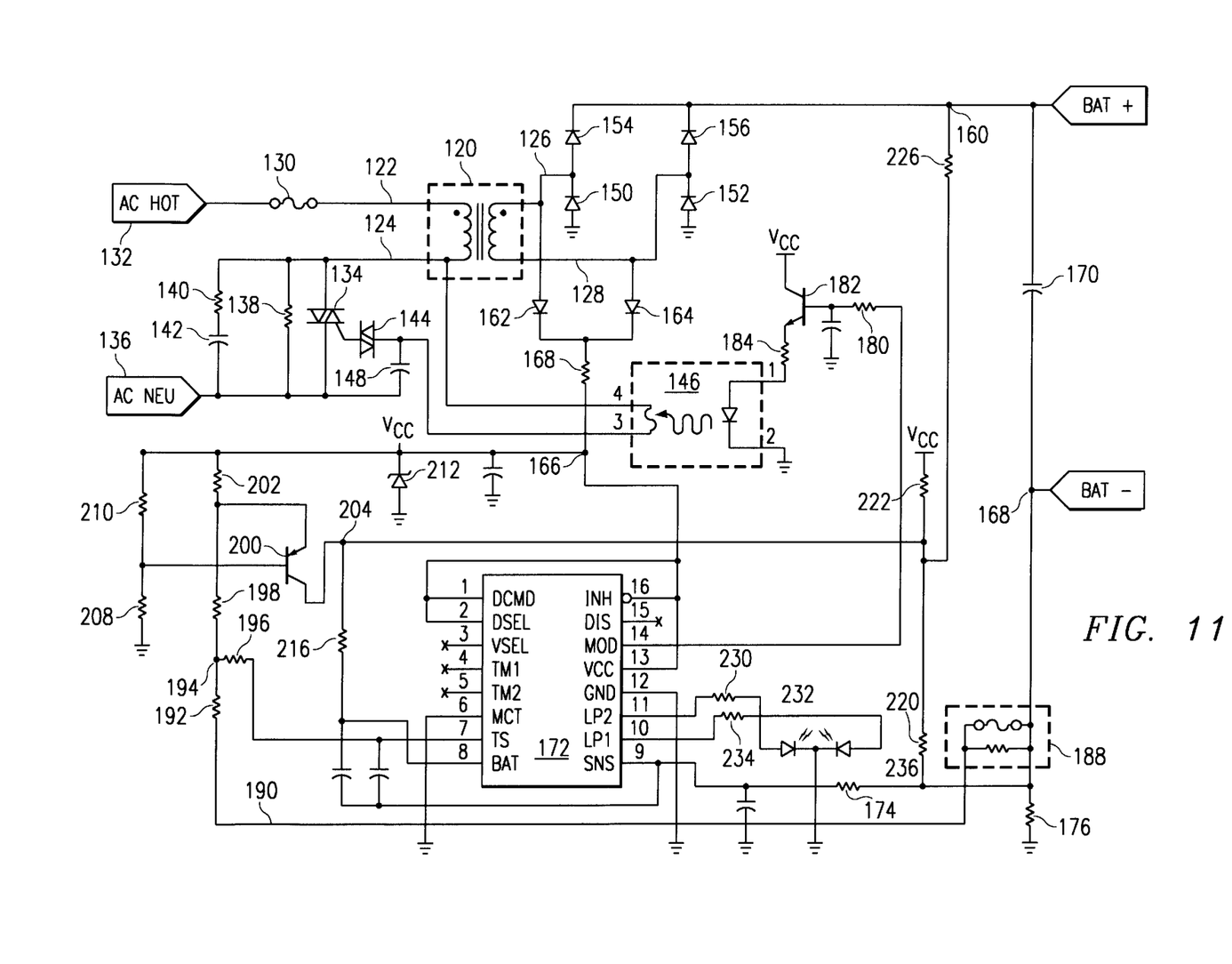
FIG. 11 illustrates a detailed embodiment of the phase regulator utilized in conjunction with the transformer in an exemplary embodiment.

Referring now to FIG. 11, there is illustrated a schematic diagram of one embodiment of the present invention, illustrating the use of the bq2004 in a charging application. This configuration utilizes a switching element in the primary leg of the transformer. A transformer 120 is provided having two primary inputs 122 and 124 and two secondary outputs 126 and 128 and is designed having internal leakage inductance, this not being illustrated in FIG. 11. The input leg 122 is connected through a fuse 130 to an AC terminal 132 referred to as the "AC HOT" input. The primary input 124 is connected to one side of a triac 134, the other side of the triac connected to an AC input labeled as the neutral input "AC NEU" terminal 136. An external AC source is connected across the terminals 132 and 136. A resistor 138 of a value of approximately 3.9 kOhms is disposed in parallel with the triac 134 and, although not discussed here, is utilized to maintain a leakage current to a load, such as a battery, when the triac 134 is turned off. A series configured resistor 140 and a capacitor 142 are connected in parallel with the resistor 138, the resistor 140 having a value of approximately 100 Ohms and the capacitor having a value of 0.068 microfarads. The gate of the triac 134 is connected to one side of a silicon biased gate 144, the other side thereof connected to one side of an optical switch 146, optical switch 146 having the other side thereof connected to the primary input 124. A capacitor 148 is connected between the other side of the silicon bilateral switch 144 and the terminal 136. A full wave rectifier is provided with four diodes 150, 152, 154 and 156, diode 150 having the anode thereof connected to ground and the cathode thereof connected to node 126, the diode 152 having the anode thereof connected to node 126 and the cathode thereof connected to an output load terminal 160, the diode 152 having the anode thereof connected to ground and the cathode thereof connected to the secondary output terminal 128, and the diode 156 having the anode thereof connected to the secondary output 128 and the cathode thereof connected to node 160. This provides the primary rectified current to the terminal 160.

An additional full wave rectifier is provided for the purpose of a low power supply voltage which utilizes the diodes 150 and 152 in addition to two diodes 162 and 164, diode 162 having the anode thereof connected to the secondary output terminal 126 and the cathode thereof connected to a power supply node 166 through a resistor 168 of a value of 620 Ohms, the diode 164 having the anode thereof connected to node 128 and the cathode thereof connected to the one side of the resistor 168 with the cathode of diode 162. Node 166 provides the voltage $V_{cc}$. Diodes 162 and 164 are small signal diodes, since the current to the power supply node 166 is relatively low. The purpose of the diodes 162 and 164 is to provide an isolated and separate power supply as compared to the node 160. The other terminal of the battery is provided for on a node 168, wherein node 160 goes to the positive battery terminal and node 168 goes to the negative battery terminal, there being a 10 microfarad capacitor 170 disposed between node 160 and 168. It should be understood that, when the battery is connected, it constitutes a relatively large capacitance in and of itself.

The control aspect of the switching regulator is provided by an integrated circuit 172 of the type bq2004. This is provided with a sense SNS input which is connected through a resistor 174 to the negative battery terminal 168, the sense resistor 176 having the other side thereof connected to ground, resistor 174 having a value of approximately 75 kOhms. Node 168 is connected to ground through a sense resistor 176, having a value of approximately 0.04 Ohm. The sense resistor 176 is operable to measure the current being passed through the battery (not shown) disposed across terminals 160 and 168, with the low value thereof not resulting in a large voltage drop or power dissipation therein. The integrated circuit 172 has a modulation output MOD connected through a bias resistor 180, with a value of 10 kOhms, to the base of an NPN transistor 182. Transistor 182 has the collector thereof connected to $V_{cc}$ and the emitter thereof connected through a resistor 184 of a value of 220 Ohms to the control input of the optical switch 146, which optical switch 146 allows for control of the gate of the triac 134 in an optically isolated manner. The overall operation provided is one of current regulation.

A temperature sensor 188 is provided which is a resistive element connected between the terminal 168 and a node 190, which node 190 is connected through a resistor 192 to a node 194, resistor 192 having a value of 3 kOhms. Node 192 is connected through a resistor 196 to the temperature set input TS of the IC 172 and also through a resistor 198 of a value 2 k to the emitter of a PNP transistor 200. The emitter of transistor 200 is also connected to the $V_{cc}$ node 166 through a resistor 202 of a value 10 kOhms, with the collector thereof connected to a node 204. The gate of transistor 200 is connected to the middle of a voltage divider comprised of resistors 208 and 210 connected between power supply node 166 and ground, resistor 208 having a value of 300 kOhms and resistor 210 having a value of 75 kOhms. A zener diode 212 is connected between the power supply node 166 and ground to provide the regulation function defining the low power supply voltage level, the cathode of diode 212 connected to the node 166 and the anode thereof connected to ground. The node 204 on the collector of transistor 200 is connected through a resistor 216 of a value of 300 kOhms to the battery input BAT, and also through a resistor 220 to node 168 of a value of 121 kOhms and through a resistor 222 to the $V_{cc}$ node 166, with a value of 280 k, resistors 222 and 220 providing a voltage divider function. Node 204 is also connected through a resistor 226 to node 160, resistor 226 having a value of 618 k.

A display output is provided with two outputs LP1 and LP2 for the IC 172. LP1 is connected through a resistor 230 to the cathode of a red LED 232, the cathode thereof connected to ground. Similarly, the LP1 output is connected through a resistor 234 to the anode of an LED 236, the cathode thereof connected to ground. This is a green LED. These diodes provide various display outputs in the form of either flashing outputs, steady outputs or no output. Again, the overall switching operation is provided by the modulation output on the MOD pin and is described in U.S. Pat. No. 5,352,970, which was incorporated herein by reference.

In operation, the triac 134 is turned on by the modulation output of the IC 172 in accordance with the phase regulation operation. Once turned on, the triac 134 will be maintained on until the current therethrough goes below zero. Therefore, the switching operation will be at a zero current level. When the triac 134 is turned off, there is no voltage across the primary, with the exception of some residual voltage due to the resistor 138. However, once the triac 134 is turned on, voltage is impressed across the primary and the internal leakage inductance (not shown) of transformer 120, such that energy will be stored in the leakage inductance. As the AC signal voltage decreases, the energy in the inductor will be transferred through to the secondary of the transformer 122 and then to the battery. Current will continue to be coupled through the transformer until the current goes to zero and the triac 134 shuts off. The secondary, in this mode of operation, is effectively "clamped" to the battery voltage since energy stored in the inductance will be transferred across the transformer from the primary to the secondary wherein, when the triac 134 is turned off, there is no voltage impressed across the primary.

The resistor 138, in conjunction with the transformer 120, provides a voltage divider operation when the triac 134 is off. The purpose of this is to provide some small amount of current to the secondary transformer 120. This will allow the power supply node 166 to be maintained at the power supply level of $V_{cc}$ to power the IC 172. Further, a trickle current will be supplied to battery, even though there is no regulated voltage going thereto. In this mode, the battery itself provides the regulating function, as current cannot flow into the battery due to the forward biased nature of diodes 154 and 156 and the current draw to the battery will cause a relatively large drop across the transformer 120 which, if it falls below one diode drop above the battery voltage, will result in no current be transferred to the battery.

Although the disclosed embodiment refers to a DC current regulation scheme, is should be understood that DC voltage regulation is also covered by the disclosed structure, the DC voltage regulation scheme being the reciprocal of the DC current regulation scheme. In the disclosed embodiment, the DC current regulation scheme requires that the current delivered to the battery be measured. This is facilitated by the sense resistor 176 in FIG. 11.

In summary, there has been provided a charging circuit that utilizes an AC input voltage with a voltage higher than the desired output DC voltage, a transformer for transforming the voltage down to an intermediate voltage, a rectifying circuit for rectifying the AC voltage and a switching regulation control circuit for operating the system as a switching regulator. The inductive storage element for the switching regulator is the leakage inductance for the transformer, wherein the transformer is designed to have leakage inductance that is sufficient to have a leakage inductance that will provide adequate regulation at the rated current levels with a switching element controlled by the regulation control circuit that will switch current to the inductor when closed and to allow energy to be stored in the inductor, which energy can then be transferred to the load. Although the preferred embodiment has been described in detail, and it should be understood that various changes, substitutions and alterations can be made therein without departing from the spirit and scope of the invention as defined by the appended claims.

What is claimed is:

1. A power supply for converting a voltage from an AC signal source at a first level to a regulated DC voltage at a lower level before delivery to a load, comprising:
    a transformer having a primary winding wound on a core and connected across the AC source and a secondary winding wound on said core, said transformer having a finite leakage inductance associated and integral with said primary winding;
    a rectification circuit connected to said secondary winding for rectifying the current therefrom for delivery to the load;
    a switching element for selectively allowing current to be delivered from the AC source through said transformer to the load, such that energy is transferred from the AC source to said leakage inductance for storage therein and subsequent transfer to the load; and
    a switch control for controlling said switching element to operate in a periodic mode, whereby the current to the load is measured and said switching element switched at a periodic rate and the conduction time of the switching element varied to adjust the current delivered to the load in such a manner that said switching element and said transformer with its associated leakage inductance is operated in a switching regulation manner wherein the series resistance of said leakage inductance is defined to insure that the RMS current is sufficiently minimized without detracting from the desired output average current.

2. The power supply of claim 1, wherein said switching element is operable to be disposed in series with said rectification circuit and the load.

3. The power supply of claim 1, wherein said switching element is operable to be disposed in a series configuration with said primary winding.

4. The power supply of claim 1, wherein said switch control is operable to control said switching element such that said switching element is turned off to switch from a conductive mode to a non-conductive mode when the current therethrough is at a substantially zero level.

5. The power supply of claim 4, wherein said switching element comprises a triac.

6. The power supply of claim 1, and further comprising a trickle device for allowing said transformer to pass a low level of current to the load when said switching element is off and non-conductive.

7. The power supply of claim 6, wherein said switch control operates from a separate regulated voltage which is derived from said secondary winding, and wherein said current provided by said trickle device is sufficient to power said separate regulator when said switching element is non-conductive.

8. The power supply of claim 6, wherein said trickle device comprises a resistor that is disposed in parallel with said switching element.

9. The power supply of claim 1, wherein said core comprises a UI core.

10. The power supply of claim 1, wherein the load comprises a battery.

11. The power supply of claim 1, wherein said core comprises a primary leg for having said primary winding wound thereabout and a secondary leg having said secondary winding wound thereabout and two connecting legs to define a window in the center thereof between said primary and secondary legs, such that said primary winding and said secondary winding are loosely coupled.

12. The power supply of claim 1, wherein the voltage on said secondary winding is a regulated voltage.

13. A power supply for converting a voltage from an AC signal source at a first level to a regulated DC voltage at a lower and regulated DC voltage level before delivery to a load, comprising:
    a transformer having a primary winding wound on a core and connected across the AC source and a secondary winding wound on said core, said transformer having a finite leakage inductance associated and integral with the primary winding;
    a rectification circuit connected to said secondary winding for rectifying the current therefrom for delivery to the load;
    a switching element for selectively allowing current to be delivered from the AC source through said transformer to the load, such that energy is transferred from the AC source to said leakage inductance for storage therein and subsequent transfer to the load; and
    a switch control for controlling said switching element to operate in a periodic mode, whereby the voltage on the load is measured and said switching element switched at a periodic rate and the conduction time of the switching element varied to adjust the current delivered to the load in such a manner that said switching element and said transformer with its associated leakage inductance is operated in a switching regulation manner wherein the series resistance of said leakage inductance is defined to insure that the RMS current is sufficiently minimized without detracting from the desired output average current.

14. A method for converting a voltage supply from an AC signal source at a first level to a regulated DC output at a lower level for delivery to a load, comprising the steps of:

provide a transformer having a primary winding wound on the core and connected across the AC source and the secondary winding wound on the core, the transformer having a finite leakage inductance associated and integral with the primary winding;

translating the voltage from a higher level at the AC source voltage to a lower intermediate AC voltage level;

rectifying the intermediate AC voltage level with a rectification circuit connected to the secondary winding;

selectively allowing current to be delivered from the AC source to the primary winding of the transformer and subsequently from the secondary winding of the transformer to the load with a switching element, such that energy is transferred from the AC source to the integral leakage inductance in the transformer for storage therein and subsequent transfer to the load; and controlling the switching element to operate in a periodic mode, whereby the current to the load is measured and the switching element switched at a periodic rate and the conduction time of the switching element varied to adjust the current delivered to the load in such a manner that the switching element and the transformer with associated integral leakage inductance is operating in a switching regulation manner wherein the series resistance of the leakage inductance is defined to insure that the RMS current is sufficiently minimized without detracting from the desired output average current.

15. The method of claim 14, and further comprising the step of providing a trickle device and allowing the transformer to pass a low level of current to the load through the trickle device when the switching element is off and non-conductive.

16. A method for converting an AC voltage signal level to a regulated DC voltage level, which is at a lower voltage level than the AC voltage level for delivery to a load, comprising the steps of:

providing a transformer having a primary winding wound on a core and connected across the AC signal source and a secondary winding wound on the core;

rectifying the current on the secondary winding for delivery to the load with a rectification circuit;

the transformer having an associated integral leakage inductance in the primary winding;

selectively allowing current to be delivered from the AC signal source to the transformer and from the transformer to the load with a switching element, such that energy is transferred from the AC signal source to the integral leakage inductance for storage therein and subsequent transfer to the load; and controlling the switching element to operate in a periodic mode, whereby the voltage on the load is measured and the switching element switched at a periodic rate to adjust the current delivered to the load by varying the time that the switching element conducts, in such a manner that the switching element and the transformer are operated at a harmonic or other frequency of the AC signal source wherein the series resistance of the leakage inductance is defined to insure that the RMS current is sufficiently minimized without detracting from the desired output average current.

17. The method of claim 16, wherein the periodic rate operates at least at the frequency of the AC signal source, such that for each cycle of the AC signal source, the switching element will conduct at least once.

18. A power supply for converting voltage from an AC signal source at a first level to a regulated DC output at a lower voltage level for delivery to a load, comprising:

a transformer having a primary winding wound on a core and connected across the AC signal source and a secondary winding wound on said core;

a rectification circuit connected to said secondary winding for rectifying the current therefrom for delivery to the load;

a finite leakage inductance integral with said primary winding;

a switching element for selectively allowing current to be delivered from the AC signal source to the primary winding of said transformer and subsequently from the secondary winding of the transformer to the load, such that energy is transferred from the AC signal source to said leakage inductance for storage therein and subsequent transfer to the load; and a switch controller for controlling said switching element to operate in a periodic mode, whereby the current to the load is measured and said switching element switched at a periodic rate to adjust the current delivered to the load by varying the time that said switching element conducts, in such a manner that the switching element and said transformer are operated at a harmonic of the frequency of the AC signal source wherein the series resistance of said leakage inductance is defined to insure that the RMS current is sufficiently minimized without detracting from the desired output average current.

19. The power supply of claim 18, wherein said periodic rate operates at least at the frequency of said AC signal source, such that for each cycle of the AC signal source, said switching element will conduct at least once.

20. The power supply of claim 18, wherein said switching element is operable to be disposed in series with said rectification circuit and the load.

21. The power supply of claim 18, wherein said switching element is operable to be disposed in a series configuration with said primary winding.

22. The power supply of claim 18, wherein said switch controller is operable to control said switching element such that said switching element is turned off to switch from a conductive mode to a non-conductive mode when the current therethrough is at a substantially zero level.

23. The power supply of claim 22, wherein said switching element comprises a triac.

24. The power supply of claim 18, and further comprising a trickle device for allowing said transformer to pass a low level of current to the load when said switching element is off and non-conductive.

25. The power supply of claim 24, wherein said switch controller operates from a separate regulated voltage which is derived from said secondary winding, and wherein said current provided by said trickle device is sufficient to power said separate regulator when said switching element is non-conductive.

26. The power supply of claim 24, wherein said trickle device comprises a resistor that is disposed in parallel with said switching element.

27. The power supply of claim 18, wherein said core comprises a UI core.

* * * * *